Jan. 18, 1938.  A. MONTAN ET AL  2,105,548
RAKE
Filed Nov. 21, 1936  2 Sheets-Sheet 2
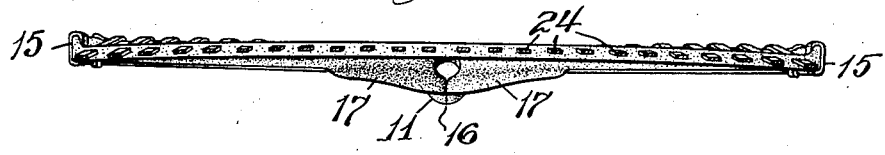
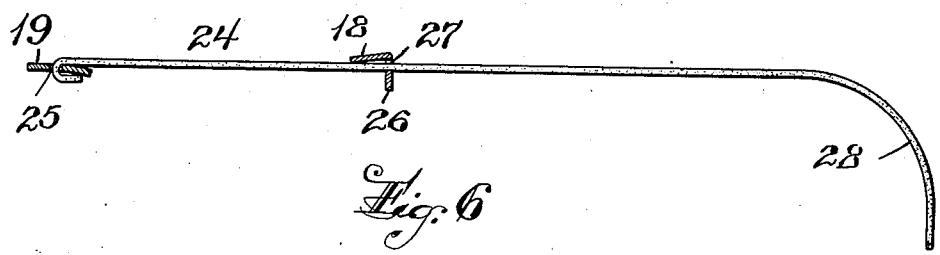
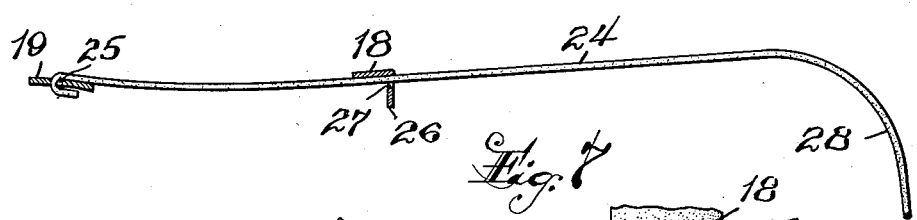
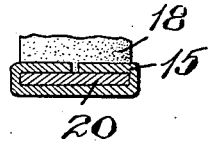
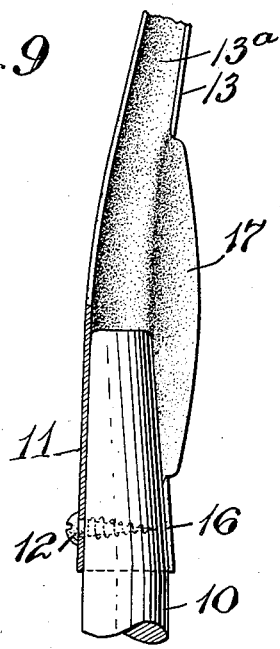
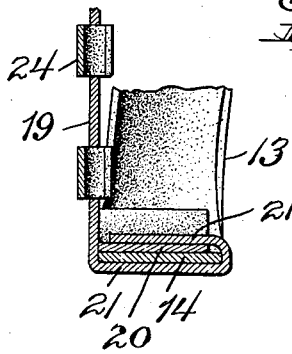
INVENTORS.
Adolf Montan, and
BY Carl E. Anderson,
Wm H Caufield,
ATTORNEY Patented Jan. 18, 1938

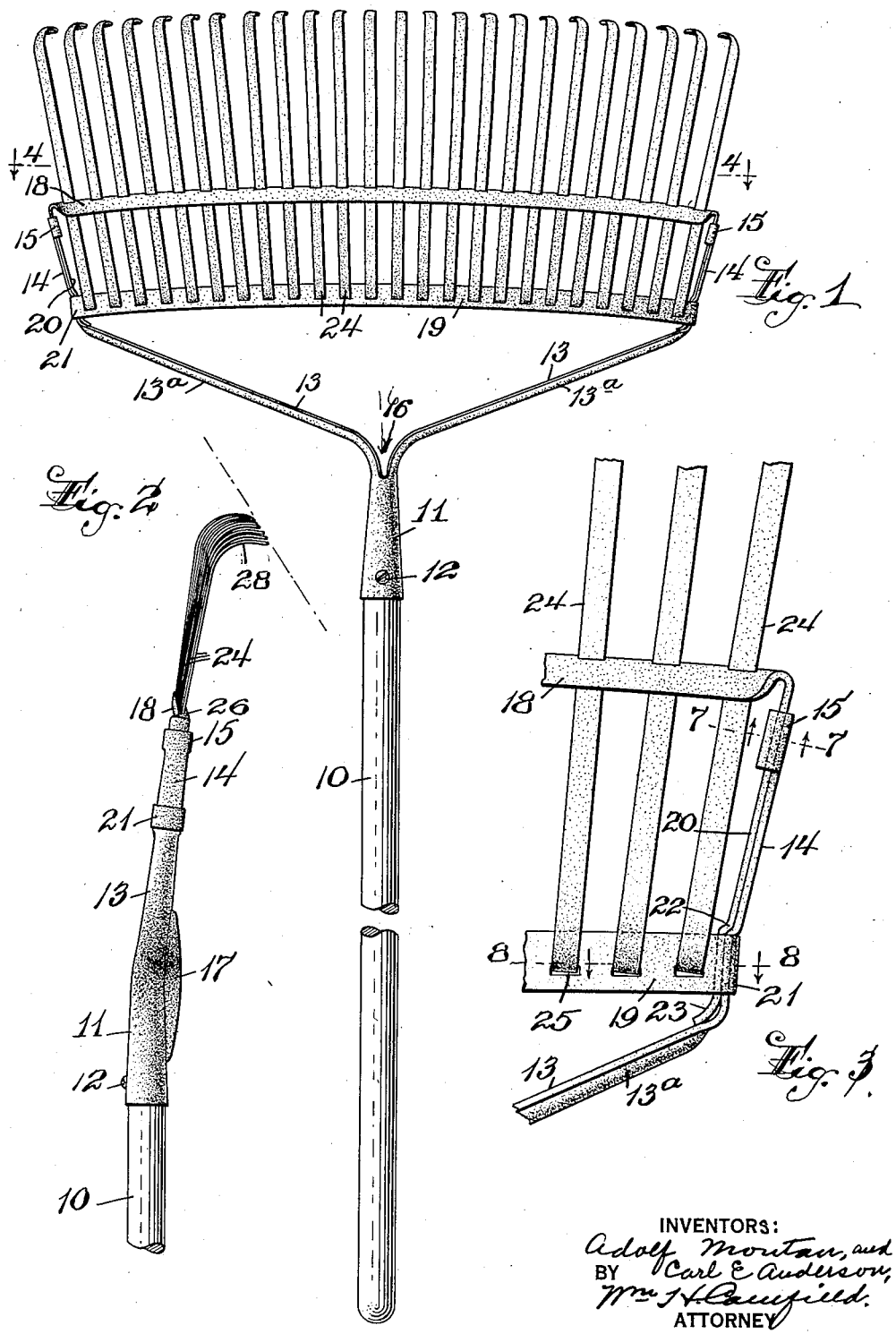

2,105,548

UNITED STATES PATENT OFFICE 2,105,548

RAKE

Adolf Montan, Montclair, and Carl E. Anderson, East Orange, N. J., assignors to Eastern Tool & Mfg. Co., Bloomfield, N. J.

Application November 21, 1936, Serial No. 112,004

2 Claims. (Cl. 55—114)

This invention relates to rakes made of metal with resilient tines and which is light in weight and will withstand the strain of raking leaves and other material and when used on a lawn will not damage or uproot the grass.

The object of the invention is to provide a rake of the above type which is constructed of few parts but is made to withstand the strains at such points where sturdiness is required.

Another object of the invention is to provide a rake in which light spring tines with curved ends are used and the tines are so arranged that the ends of all the tines rest on the ground when the rake is held in normal inclined position. This insures a raking of material for the full width of the row of tines.

The invention is illustrated in the accompanying drawings in which Figure 1 is a top view of a rake made according to my invention. Figure 2 is a side view of the rake shown in Figure 1. Figure 3 is a top view, enlarged, of a detail showing the securing of the tine assembly and the yoke. Figure 4 is a section on line 4—4 in Figure 1. Figure 5 is a section of the tine holding bars with a tine in normal position shown in elevation. Figure 6 is a view similar to Figure 5 with the tine under flexure. Figure 7 is a section on line 7—7 in Figure 3 but on an enlarged scale. Figure 8 is a section on line 8—8 in Figure 3 on an enlarged scale. Figure 9 is a section of part of the yoke where it is attached to the handle with the end of the handle in elevation.

The handle is shown at 10 and the rake is attached to the handle by means of a yoke consisting of a socket 11 at one end, which fits on the end of the handle and may be held in place by a nail or screw 12 passing through a hole in the socket.

The yoke has two divergent arms 13 which are stiffened by curvature or ribbing as at 13a and which arms terminate in extensions 14. The extensions have each a clip 15 on the end. The yoke is made of one piece with the socket split at 16. Where the socket and divergent arms are joined there are fins 17, one on each side and on the bottom. These fins extend part way along the socket and part way under the arms and strengthen this part of the rake to minimize the chance of breaking at this point where the strain is concentrated at the end of the handle.

The tine-holding bracket comprises a forward brace 18 and rear brace 19 spaced apart and preferably curved. The ends of the forward brace are bent back as at 20 and these parts that are bent back rest against the extensions 14 of the yoke. The bent-back parts 20 are embraced near the forward brace by the clips 15. The bent-back parts 20 and the extensions 14 of the yoke are embraced by the ends of the rear brace 19 as at 21, as shown in detail in Figure 8. The extensions 14 and the parts 20 are off-set as at 22 to form a shoulder which seats the ends 21 of the rear brace 19 to hold the tine bracket from riding forward. The ends of the parts 20 extend to have their turned ends 23 rest against the ends of the arms 13 of the yoke to hold the tine bracket against rear movement and to brace the bend where the arms 13 join the extensions 14.

The tines 24 are arranged in fan-like formation and are made of spring metal, preferably from flat stock and are secured to the rear brace 19 and extend through the forward brace 18. The rear brace is slightly bent to stiffen it and is perforated with slots 25 through which the ends of the tines are passed and bent over under the brace 19 as shown in Figures 5 and 6. This bend is not tight but allows a slight play by the tine.

The front brace 18 is provided with a downwardly extending flange 26 on its front edge to stiffen it and to support the tines which extend through spaced slots 27 in the flange 26. The brace 18 slopes downwardly to the rear and thus forms a support for the tines when they are flexed under use as shown in Figure 6. This flexure of a tine causes it to bear against the brace, as the hole 17 is larger than the thickness of the tine and the loose bend at the brace 19 allows the tine to turn slightly in the hole 25. The tines are thus free of contact with sharp edges and the breakage of the tines at the front brace is minimized.

The free ends of the tines are bent, usually curved, as at 28 and the tines are longest at the ends and gradually are shorter toward the center. This formation supports the rake at the end tines when lying flat on the ground but as the handle is raised the shorter tines engage with the ground whereby the tines all engage a plane surface when the handle is raised to the inclined position in which it is used in raking. This is clearly shown in Figure 2 where a dotted line indicates the surface of the ground.

This rake has been found to withstand raking operations with the strains resisted at the proper points and with normal use the rake will retain its shape and last a long time.

We claim:—

1. A rake comprising a yoke having a handle receiving part on the end and having two divergent arms with extensions of substantially flat form, the ends of which form clips, a tine holding bracket comprising a forward brace and a rear brace, the forward brace having its ends bent back beyond the rear brace, the rear brace having its ends embracing the said bent back ends and the extensions, the clips embracing the said bent back ends near the forward brace.

2. A rake comprising a yoke having a handle receiving part on the end and having two divergent arms with extensions of substantially flat form, the ends of which form clips, a tine holding bracket comprising a forward brace and a rear brace, the forward brace having its ends bent back beyond the rear brace, the rear brace having its ends embracing the said bent back ends and the extensions, the clips embracing the said bent back ends near the forward brace, the said extensions and the bent back ends having off-set portions to form shoulders for the engagement of the bent ends of the rear brace.

ADOLF MONTAN.
CARL E. ANDERSON.